No. 645,844. Patented Mar. 20, 1900.
C. T. ADAMS.
TIRE FOR VEHICLES.
(Application filed July 26, 1899.)
(No Model.)
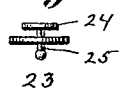
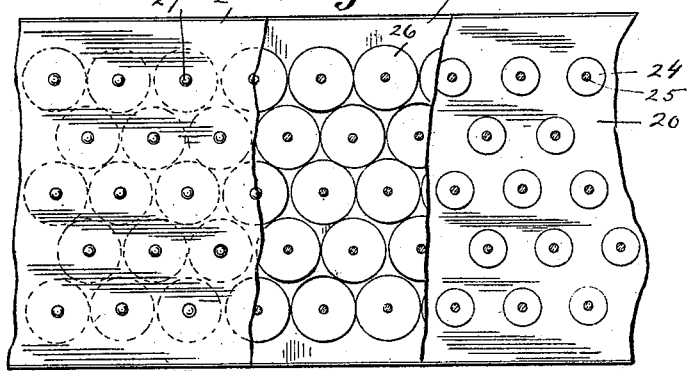
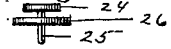
WITNESSES:
INVENTOR
Calvin T. Adams
BY
ATTORNEY

UNITED STATES PATENT OFFICE.

CALVIN THAYER ADAMS, OF NEW YORK, N. Y.

TIRE FOR VEHICLES.

SPECIFICATION forming part of Letters Patent No. 645,844, dated March 20, 1900.

Application filed July 26, 1899. Serial No. 725,148. (No model.)

*To all whom it may concern:*

Be it known that I, CALVIN THAYER ADAMS, a citizen of the United States, residing in the city, county, and State of New York, have invented a new and useful Improvement in Tires for Vehicles; and I do hereby declare that the following is a full, clear, and exact description of the same.

The object of my invention is to provide simple, efficient, and practical means for preventing the pneumatic tires of bicycles and other vehicles, and particularly automobiles, from being punctured and also from slipping on wet pavements or when turning corners.

My invention consists, briefly, in fastening between the plies of vulcanized fabric or rubber composing the outer tube of a double-tube tire or composing a separate strip attached as a tread to the tire metal disks or plates of hard material, which substantially cover and protect against punctures the tread portion of the tire.

My invention also consists in extending legs or shanks from said hard plates through the outer fabric ply to engage the surface of the ground and prevent slipping, also in clenching and upsetting or expanding said outwardly-extending shanks on or in the outer ply to assist in holding the plates and shanks in place therein, and also in extending shanks from said hard plates inward through the inner ply and in providing the shanks thereat with integral heads or in clenching them on said ply or expanding them in said ply to assist in holding the plates and shanks in place.

In order that my invention may be fully understood, I shall first describe in detail the manner in which the invention is carried into practice and then point out its distinctive features in the claims.

Reference is to be had to the accompanying drawings, forming part of this specification, in which the same parts are designated by like numbers in all the figures.

Figure 1 is a longitudinal sectional view of part of a vehicle-tire provided with an armored non-slipping tread embodying my invention. Fig. 2 is a broken plan view of the same. Fig. 3 represents the rivet and washer used in said embodiment of my invention. Fig. 4 is a sectional view representing another form of my invention, and Fig. 5 represents the metal plate and shank used therein.

In all the figures, 20 designates the air-tube of a pneumatic vehicle-tire, and 21 and 22 are the inner and outer plies, respectively, composing a strip which is cemented or otherwise secured around the peripheral tread portion of the tube 20; but the invention is equally applicable to a double-tube tire, in which case the plies 21 and 22 may compose the outer tube or shoe of the tire.

In the form of my invention shown in Figs. 1 and 2 rivets 23, having heads 24 and shanks 25, are driven from the inside through the inner tread-ply 21, which may be woven fabric or rubber or vulcanized fabric. Hard plates 26 in the form of metal washers are then placed on the shanks of the rivets 23 against the outer surface of the inner ply 21 in such close proximity to each other as to practically cover and armor the entire tread portion of the ply 21 without materially impairing its flexibility and elasticity. The outer tread-ply 22 is then cemented or secured to the inner tread-ply and the covering-plates 26, the shanks 25 being driven through the outer tread-ply and clenched or upset on the outer surface thereof, forming heads 27.

The substantially-complete layer of metal plates 26 between the two plies of fabric thus effectually prevents the air-tube of the tire from being punctured without injuriously affecting the elasticity of the tire, while at the same time the heads 24 on the inside of the inner ply and the heads 27 on the outside of the outer ply securely bind all parts together. Further, the hard heads 27, exposed on the outside of the tread, act most effectually in preventing the tire from slipping, as on wet pavements, as they rigidly engage, without actually penetrating, the ground and at the same time yield, owing to their elastic support, to permit the rubber portion of the tread to make its necessary adhesive contact with the ground.

In Figs. 4 and 5 the form of my invention represented is the same, except that the outer ends of the shanks 25 are not headed, but may be simply expanded by longitudinal pressure, so as to be bound laterally by the fibers of both the outer and inner tread-plies. In lieu of the rivets and plates thus shown plates may be used having peripheral prongs or legs serving as the shanks, which prongs or legs may be either upset or merely expanded in the superposed plies, or the plate itself may have integral shanks projecting from opposite sides thereof into the respective plies. In any of these forms of my invention the result is a composite armored strip the component plies and plates of which are firmly united together. This composite strip may be cemented or vulcanized to an ordinary single-tube pneumatic or cushioned tire, or, as before stated, may constitute the outer tube of a double-tube tire.

Having thus described my invention, I claim as new and desire to secure by Letters Patent—

1. A pneumatic or cushioned vehicle-tire having superposed component fabric plies inclosing therebetween an armoring layer of hard plates or heads, having shanks extending through both the outer and inner plies.

2. A pneumatic or cushioned vehicle-tire having superposed component fabric plies inclosing therebetween an armoring layer of hard plates or heads, having shanks extending through both the outer and inner plies and upset or expanded on or in the outer ply.

3. A pneumatic or cushioned vehicle-tire having superposed component fabric plies inclosing therebetween an armoring layer of hard plates or heads, having shanks extending through both the outer and inner plies and upset or expanded on or in the inner ply.

4. A tread-strip or outer tube for a vehicle-tire composed of two flexible plies inclosing therebetween a layer of hard plates having shanks extending through the outer and inner plies, and expanded or headed in the inner ply.

5. A tread-strip or outer tube for a vehicle-tire composed of two flexible plies inclosing therebetween a layer of hard plates having shanks extending through both the outer and the inner plies and expanded or headed in or on both the inner and outer plies.

In testimony whereof I have hereunto set my hand the 21st day of July, 1899.

CALVIN THAYER ADAMS.

In presence of—
 DAVID G. RODE,
 E. BERENDSOHN.